United States Patent [19]
Klein

[11] Patent Number: 5,453,142
[45] Date of Patent: Sep. 26, 1995

[54] METHOD AND APPARATUS FOR SECURING SHEETS TO SLATS AND IN SPACES THEREBETWEEN FOR FORMING A COMPOSITE STRUCTURE

[76] Inventor: André Klein, Lijtweg 1201, 2341 HE Oegstgeest, Netherlands

[21] Appl. No.: 157,081

[22] Filed: Dec. 3, 1993

[30] Foreign Application Priority Data

Jun. 3, 1991 [GB] United Kingdom ............... 9111887

[51] Int. Cl.⁶ .................. B32B 31/08; B32B 31/16; B31F 1/00
[52] U.S. Cl. .................. 156/201; 156/212; 156/213; 156/215; 156/300; 156/301; 156/461; 156/468; 156/475
[58] Field of Search .................. 156/383, 391, 156/541, 562, 213, 292, 297, 291, 201, 212, 215, 300, 301, 461, 468, 475; 2/256, 260, 260.1, 261, 262; 428/235, 236; 160/264, 231.1, 231.2

[56] References Cited

U.S. PATENT DOCUMENTS

| | | | |
|---|---|---|---|
| 20,630 | 6/1858 | Cornell | 160/231.1 |
| 626,475 | 6/1899 | Andrews | 160/264 |
| 2,284,563 | 5/1942 | Dillman et al. | 156/562 |
| 2,739,635 | 3/1956 | Seaborne et al. | 156/291 |
| 2,829,081 | 4/1958 | Sweem | 160/231.2 |

FOREIGN PATENT DOCUMENTS

| | | |
|---|---|---|
| 1283242 | 12/1961 | France . |
| 2232655 | 1/1975 | France . |

Primary Examiner—Michael W. Ball
Assistant Examiner—Richard Crispino
Attorney, Agent, or Firm—Clifford A. Poff

[57] ABSTRACT

A composite structure such as a roller door comprises a plurality of rigid slats (1) arranged parallel with one another and spaced apart transversely in an array, the array of slats being sandwiched between upper (3) and lower (4) flexible sheets fixed together in the spaces (5) between adjacent slats to form flexible hinge portions. Preferably the structure is formed by advancing the array of slats (1), in the longitudinal direction of the slats through means which applies the upper and lower flexible sheets to the upper and lower surfaces of the slats and bonds the flexible sheets to the upper and lower surfaces of the slats, then passing the resulting assembly, still in the longitudinal direction of the slats, through apparatus which bears on the flexible sheets and deforms them, in the interstices between the slats, until the upper and lower sheets come together in said interstices and are bonded to each other where they come together. Thus, the slats are securely encapsulated between the flexible sheets and the portion of the flexible sheets between adjacent slats form said flexible hinge portions.

12 Claims, 4 Drawing Sheets

METHOD AND APPARATUS FOR SECURING SHEETS TO SLATS AND IN SPACES THEREBETWEEN FOR FORMING A COMPOSITE STRUCTURE

The present invention relates to a new type of structure which may be used, for example, in roller doors, window shutters, folding doors, room partitions and the like. The invention also relates to a method of making such a structure.

Roller door structures are known which comprise a multiplicity of rigid slats alternating with hinge forming elements allowing such a structure to be used in an extended state as a flat barrier extending across a doorway and to be opened by rolling or folding up. Similarly structures are also known as analogous closures for openings for example in items of furniture. Hitherto, for roller doors at least, such structures are known to fall mainly into three categories:

1. Wooden slats glued to a flexible backing, mostly textiles, where the hinge function is performed by the backing material.
2. Metal or plastic interlocking slats, where the hinge function is performed by the pivotal action allowed in the interlocking parts of the slats.
3. A monolithic structure, moulded from an appropriate plastic, preferably polypropylene, where slats with thick sections alternate with very thin hinge formations, which perform the hinge function. Such products and processes to make them are described in UK Patent 1476967 and EP1295587A2.

While all these three types are used extensively, they all have their own limitations and drawbacks, some common to all three of them.

Type 1. Wooden Slats on Fabric

This is essentially a wooden product and as such subject to distortions, unless specially selected or treated to avoid distortion. Structures of this type:

Cannot be employed in humid atmospheres like kitchens or bathrooms,

Lack rigidity beyond a certain height, unless made very thick and thus heavy, cumbersome and expensive and have the disadvantage that the appearance presented is always that of a wooden article unless additional decorating steps are carried out, at added cost, for other visual effects.

Type 2. Interlocking Slats a) Plastics Interlocking Slats

These are extruded slats, of a great variety of configurations, but always providing interlocking edge formations.

While the freedom for movement between adjacent slats, in the region of the interlocking formations is essential to allow the desired rolling action of the assembly, the same freedom of movement allows the slats to slide longitudinally relative to one another, thus causing frequent jamming of the structure in its guiding tracks. To prevent this, usually adhesive tape is applied at intervals, at the back of the structure, or more sophisticated remedies are employed, such as those described, for example, in French Patent Application 2600114 or UK Patent Application 2188967.

In operation, the extruded slats tend to be noisy, as they knock against each other when moving.

The rigidity of this type is very poor, as beyond a certain length the slats lack rigidity and there is no cohesion between the slats to enhance whatever rigidity they might have.

The general appearance is rather plain and utilitarian unless delicate and expensive post-extrusion processes are employed to provide decorative effects.

Plastics interlocking slats easily become dirty. Dust particles tend to settle on the edges of the slats and the slats are difficult to clean.

b) Metal Interlocking Slats

Made usually of steel or aluminium, metal interlocking slats are very heavy.

They must be protected from corrosion and painted or otherwise treated for decorative effects.

They have very good rigidity but also tend to be noisy in operation.

They are rather expensive and are mostly used where their main feature is one of protection.

Type 3. Monolithic Roller Door Structures

Monolithic roller door structures have the best overall properties, for example:

They have great dimensional stability, even in humid areas.

They make no noise in operation.

They do not jam as there are no independent moving slats.

Their weight is not excessive.

They do not readily become dirty and are easy to clean.

However, even this type of structure has its shortcomings. For example any decoration must be applied by painting the surface or by lamination, in an expensive post-production step. Such monolithic structures have inadequate rigidity for heights beyond 1500 mm, unless slats of greater thickness or of more rigid and hence more expensive materials, are used.

It is an object of the present invention to provide a novel type of structure, suitable to be used as roller doors, folding doors, shutters, partitions and the like, by which the shortcomings cited above can be eliminated and which offers the possibility of a very large number of profiles and decorative surfaces.

According to one aspect of the invention there is provided a roller door or like structure comprising a plurality of transversely spaced, parallel, elongate slats encapsulated in a thin flexible material affording flexible connections or hinges between adjoining slats.

It is an object of the invention, in another of its aspects, to provide an improved method of making a roller door or the like structure.

According to this aspect of the invention there is provided a method of making a roller door or like structure comprising providing a plurality of elongate rigid slats, locating the slats, parallel with one another and in transversely spaced relation between an upper flexible sheet and a lower flexible sheet, deforming at least one of said sheets towards the other in the interstices between adjacent slats, whereby the flexible sheets contact one another between the slats, and uniting, bonding or otherwise securing said sheets together in the regions of such contact.

According to a further aspect of the invention, there is provided a method of making a composite structure such as a roller door comprising providing a plurality of elongate rigid slats, arranging the slats in an array in which the slats lie parallel with one another and in transversely spaced relation, feeding the array of slats in the longitudinal direction of the slats through apparatus in which a flexible sheet is applied to at least one side of said array, subsequently deforming said one sheet towards the other side of the array in the interstices between adjacent slats as the slats, with said sheet, are conveyed in the longitudinal direction of said slats and, either before or after said deforming step applying to said other side of said array a further flexible sheet, the method further comprising uniting, bonding or otherwise securing said sheets together in the regions of contact between said sheets, whereby each said slat is tightly encapsulated between the upper and lower sheets and the united, bonded or otherwise secured sheets, in the regions of contact of said sheets between adjacent slats form respective hinge strips interconnecting the adjoining slats.

According to a yet further aspect of the invention, there is provided apparatus for carrying out the method including means for receiving slats, for locating a plurality of said slats in parallel side by side arrangement and for establishing predetermined spacings between adjacent said slats whereby an array of said slats is formed, means for conveying said array of slats, in the longitudinal direction of the slats, through means for applying to at least one side of said array a first flexible sheet, means for subsequently deforming said first sheet towards the other side of the array in the interstices between adjacent slats as the slats, with said first sheet, are conveyed in the longitudinal direction of said slats, and means for applying to said other side of said array, either before or after said deformation of the first sheet, a second flexible sheet and means for securing together the first and second sheets in the interstices between the slats whereby each said slat is tightly encapsulated between the upper and lower sheets and the united, bonded or otherwise secured sheets, in the regions of contact of said sheets between adjacent slats form respective hinge strips interconnecting the adjoining slats.

A structure embodying the present invention can be made to great heights and can yet be made stiff enough for most uses. Similarly a structure embodying the invention can be made with lengths to suit most commercial requirements.

Embodiments of the invention are described below, by way of example, with reference to the accompanying drawings, wherein.

Figure 1:
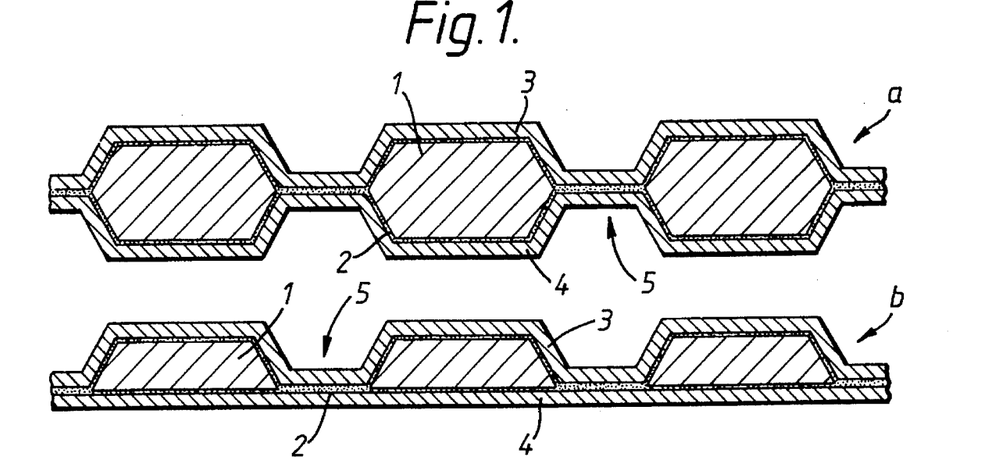
FIG. 1 is a sectional view of two composite structures produced according to the present invention using flexible sheet materials bonded together.
Figure 2:
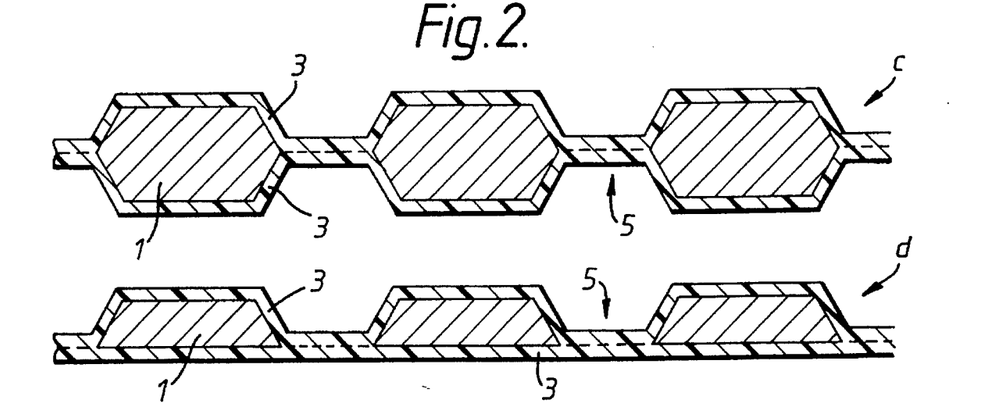
FIG. 2 is a sectional view of two composite structures embodying the invention wherein the flexible sheet materials used are made of identical thermoplastics and are welded or fused together.

Referring to FIGS. 1 and 2, a composite roller door or like structure comprises, as shown at 'a' or 'b' in FIG. 1, four components, namely a series of parallel transversely spaced elongate rigid slats 1, an adhesive 2, an upper or front layer of flexible sheet material, and a lower or back layer 4 of flexible sheet material. The flexible sheet materials for the front and the back can be identical or dissimilar.

The flexible sheet materials 3, 4 totally encapsulate each slat 1 to which they are made to adhere completely, by means of the adhesive 2, while in the hinge areas between adjoining slats the flexible frontal 3 and backing 4 sheet materials are bonded together by the adhesive layer 2 to a predetermined width, thus creating the hinge 5 itself.

FIG. 2 illustrates, at 'c' and 'd' two similar composite structures in which the flexible sheet materials for the front and the back are foils 3 made of identical thermoplastic polymers. In such specific cases it is possible to dispense with the adhesive and achieve encapsulation of the slats 1 and the formation of the hinges 5 by heat-sealing the two identical thermoplastic foils in the hinge areas between adjoining slats.

It will be understood from this brief description that, in fact, the final product represents a monolithic structure. The sheet materials 3, 4, may serve as a decorative function as well as forming the hinges between the adjoining rigid slats.

It will be apparent to anyone skilled in the art that by a judicious choice of the components a great variety of products can be made.

Hereafter, a non-exhaustive list of the main attributes of the components are given by way of illustration:

Slats

The slats give the structure its rigidity and shape.

Rigidity and weight will be dependent on the nature of the materials for example:

- wood profiles (hardwood, multi-ply or MDF)
- plastics (extrusions, pultrusions or cast profiles from thermoplastic or thermosetting, filled or non-filled polymers)
- metals (steel or aluminium or others, extruded or shaped from flat strips)
- composite slats (formed by two skins and a core material, for which a great variety of material are available). For skins: thin strips of metals, plastics, low or high pressure laminates, wood, plywood etc. For core material: plastics foams, paper honeycombs, corrugated board or metal strips, etc.
- Transparent slats of acrylic, polycarbonate or other plastics, as well as glass, can be used for transparent roller doors.
- The shape, i.e. the geometry of the slats, is also important in determining their rigidity, and also in determining the spacing of the hinges and their widths and finally the whole aspect of the structure.

Flexible Sheet Material

A host of products, from plastics sheets, textiles (woven or non-woven), leather (natural or artificial), thin wood veneers and other flexible materials can be used alone or in combination with each other.

If only one side of the structure is to be exposed to view the backside can be made of a cheap plastic foil or even a non-woven textile.

If both sides of the structure are visible, as in a door separating two rooms, both sides can be made of the same flexible sheet decor or of two different kinds.

The degrees of flexibility of the sheet materials and hence that of the hinges formed can be varied to a great extent. In addition to the intrinsic flexibility of the sheet materials, the width and thickness of the hinges can be controlled and will influence the flexibility of the hinges.

Likewise, the degree of resistance of the hinges to repeat flexing will vary and can be controlled by the correct choice of the above parameters. Naturally, for every proposed sheet material or the combination of two of them, the correct parameters influencing flexibility, have to be determined by preliminary tests.

Adhesive

It goes without saying that this component is a key feature of the whole structure.

Its main properties have to be:

excellent adhesion to all the materials it has to bond very good cohesion coupled with good elasticity and flexibility very good ageing characteristics very good resistance to humidity and temperature extremes good applicability i.e. relatively easy processibility.

Given the great variety of materials to be bonded in the production of the composite structures an appropriate choice of adhesives has to be made for each combination of these components.

No attempt is made here to specify all the adhesives which could be considered, for given the advanced state of adhesive technology the choice of adhesive is a relatively simple matter.

However, by way of example the classes of adhesives used in the preferred embodiments of the process are set out below. These are:

Pressure sensitive adhesives based on natural and synthetic rubbers and acrylics.

Reactive, partially or totally cross-linkable adhesives, mainly the polyurethanes.

These adhesives can be used as hot-melts or double faced adhesive tapes for dry processing or from solutions or water based emulsion pre-coated onto the flexible sheet materials, used as is or reactivated if necessary.

It must be stressed however, that the above indications are only intended by way of illustration and there are many other classes of adhesives which can perform satisfactorily.

Referring to FIGS. 3 to 11 there will now be described a method and apparatus for making a composite roller door structure such as described with reference to FIGS. 1 and 2.

To form the composite structure 'a' of FIG. 1 several steps are required, which are described hereafter together with the various parts of the apparatus necessary to perform them.

1. Slat Feeding and Positioning Unit

Figure 3:
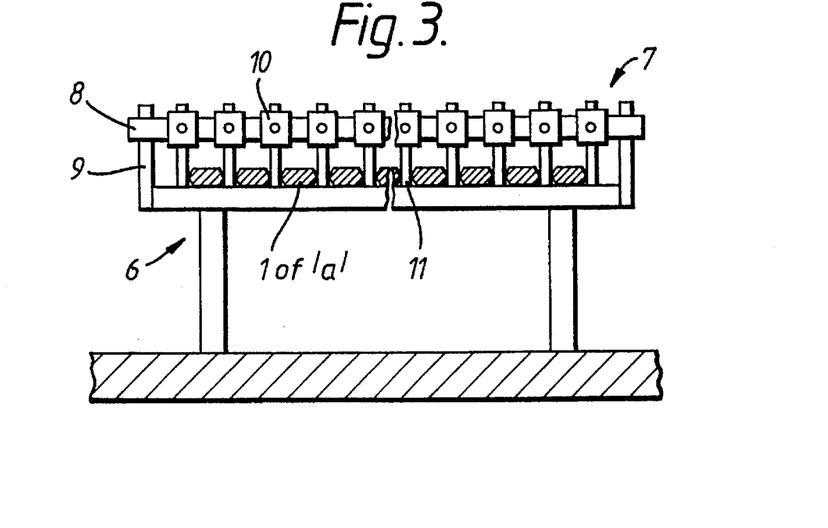
FIG. 3 is a schematic sectional view of a slat feeding table with a slat positioning device.

FIG. 3 represents schematically a slat feeding table 6 provided with a slat positioning device 7 consisting of two horizontal rectangular bars 8 placed at several centimeters above the table and extending across the table approximately one meter apart, each bar being supported by two vertical columns 9.

The rectangular bars 8 are graduated in millimeters and each carries a number of sliding members 10 each carrying a vertically adjustable rod 11, hereafter referred to as a tooth, long enough to touch the table top when lowered. The sliding members 10 carrying the "teeth" can be locked in position, with precision, anywhere along the graduated bars (8).

The "teeth" 11 resting on the table top form a comb-like structure and act as spacers between the slats, allowing their precise alignment parallel to each other. The number of the teeth 11 will be determined by the number of hinges required and the positions of teeth 11 are determined by the widths of the slats. The diameter of the teeth will determine the exact gap required between the slats to obtain the desired hinge width. For various hinge widths, "teeth" of different diameters are used and are easily interchangeable in the sliding members.

Figure 4:
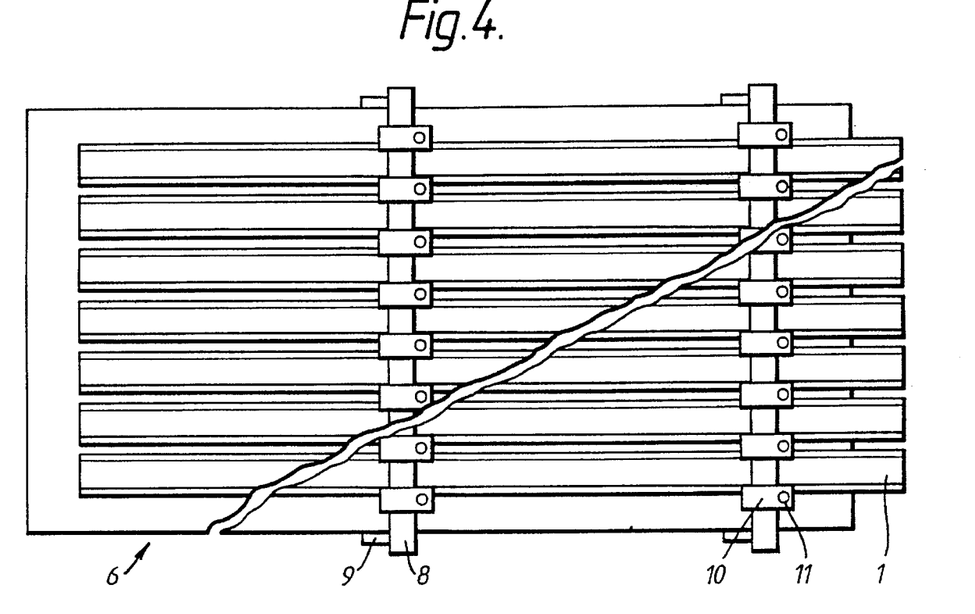
FIG. 4 is a schematic plan view from above of the slat feeding and positioning device.

FIG. 4 shows a plan view of the table 6 from above illustrating a number of slats 1 aligned in parallel with one another by the slat positioning device 7 and ready for feeding into the laminating unit.

2. Laminating Unit

Figure 5:
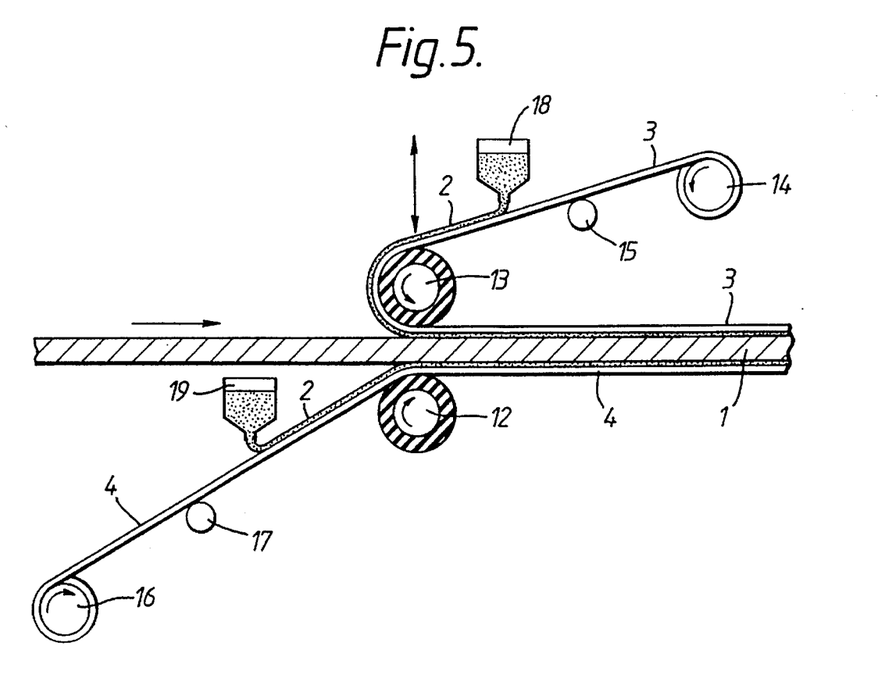
FIG. 5 is a schematic illustration of a laminating unit used to appropriately bring together the components of the composite structures.

A schematic representation of a laminating unit is shown in FIG. 5. This unit consists of a pair of rubber-covered steel cylinders, one (12), being in a fixed position, but being capable of being driven mechanically, the other (13) being free running, but being vertically adjustable by means of two hydraulic cylinders which can also apply pressure to it. Thus, the pair of rollers 12, 13, can act as "pinch rollers" and will permit the engagement and propulsion of the slats, delivered from the feeding table and that of the flexible sheet materials, 3, 4, delivered from their respective rolls 14, 16.

The flexible sheet material 3 for the front of the structure is drawn from supply roll 14 and supported on its way to roller 13 by roller 15. The flexible sheet material 3 for the front runs around roller 13. The surface of the sheet material 3 which will face outwardly in the finished product and may bear a desired decoration contacts the rubber surface of the roller 13 as the material 3 passes around the roller 13. The reverse surface of the flexible sheet 3 is coated with adhesive by a dispensing head 18. Similarly, the flexible sheet material 4 for the back of the structure is drawn from a supply roll 16 via a support roller 17, to pass over roller 12 into engagement with the slats 1. The dispensing head 18 disposed between the support roller 15 and roller 13 spreads a thin layer of adhesive over the entire surface of the flexible sheet material 3. Similarly, between support roller 17 and roller 12 another adhesive dispensing head 19 is placed which spreads adhesive over the surface of material 4 which is to engage the undersides of the slats.

The delivery of the adhesive, preferably a pressure sensitive hot-melt type, is so monitored as to allow sufficient open time to be ready for setting when the slats enter the pinch rollers. Thus, after leaving the pinch rollers the slats and flexible sheet materials are glued together, as illustrated in FIG. 5, forming a relatively rigid sandwich structure 20 having a predetermined gap width 21, between the slats.

It will be readily understood that it is not essential to apply the adhesive at the laminating unit. Flexible sheet materials pre-coated with adhesives can also be used.

These sandwich structures can be delivered by a conveyor immediately to the subsequent operation or stored if so desired.

3. Hinge Forming Unit

Figure 7:
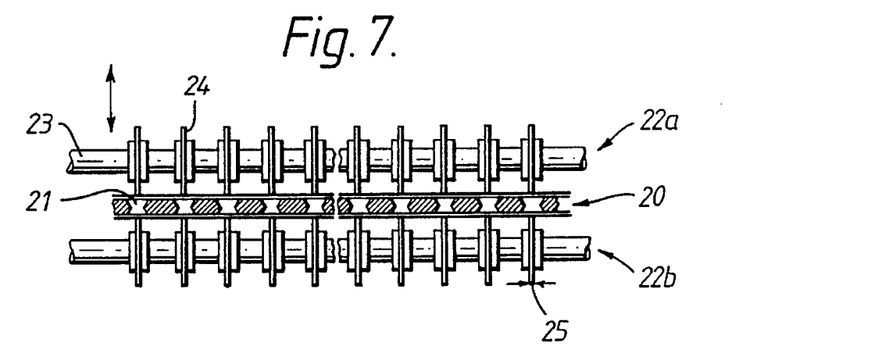
FIG. 7 is a schematic sectional view of a hinge forming unit in apparatus for making a structure embodying the present invention.

Once the sandwich structures have left the laminating unit they are conveyed to the hinge forming unit illustrated in FIG. 7.

The hinge forming unit consists essentially of a roller conveyor with Teflon covered rollers, which, while acting as a positive support to the sandwich structure, as it is being pushed over it by independent means (not illustrated), also allow for easy lateral movement of the laminated slats in respect to each other, while a pair of special "hinge forming" pinch rollers (22a and 22b) which are non-driven but are capable of applying pressure solely in the area of the gaps 21 causes the slats to approach each other to their predetermined limits and form a hinge 5 between each pair of adjoining slats, by pressing together the flexible sheet materials 3, 4 coated with adhesive, till a permanent bond is formed.

Figure 6:
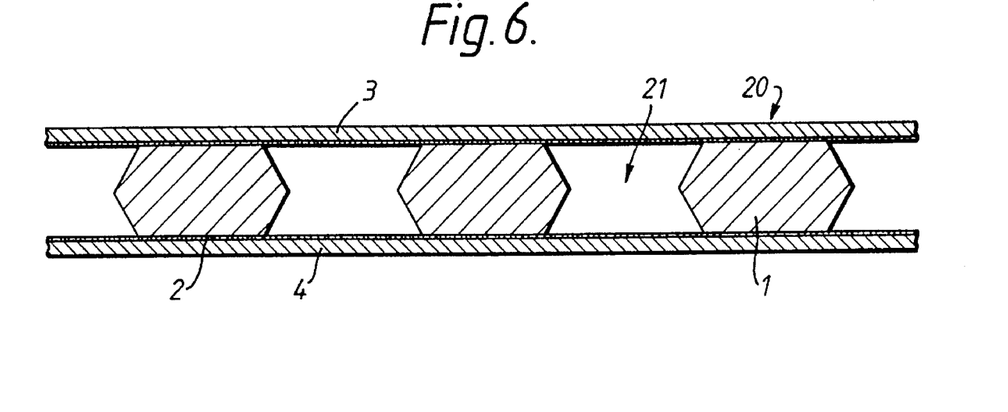
FIG. 6 is a sectional view of an intermediary product produced in one of the laminating steps of the process.

The special pinch rollers (22a and 22b) illustrated in FIG. 7 each consist of a shaft (23) onto which a number of metallic discs 24, rubber covered if necessary, can be locked into the exact position required to correspond with the centres of the gaps (c) of the sandwich structure 20 as shown in FIG. 6.

The width of the discs 25 will determine the width of the hinges.

Before entering the hinge forming unit the sandwich structure 20 has the configuration represented in FIG. 6, that is having just sufficient free (non-bonded) flexible material 3 and 4 over the gaps 21 to cover the sloping edges of the profiled slats and to form the hinges to the desired widths.

Figure 8:
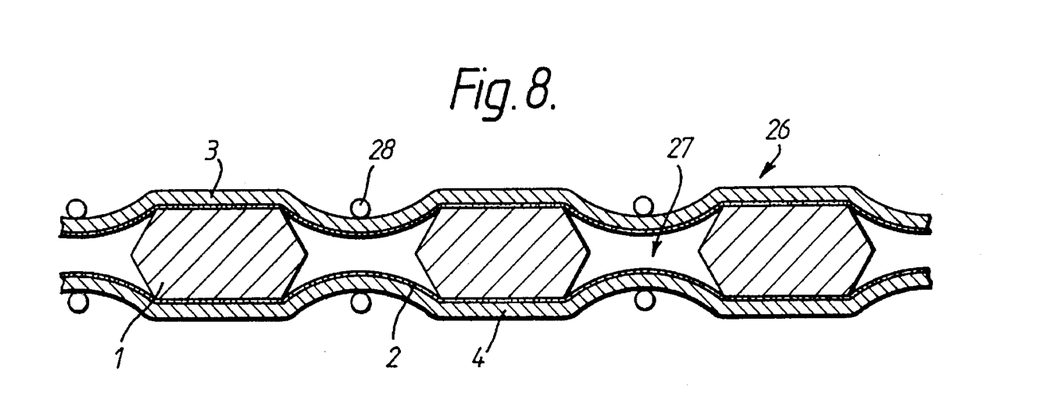
FIG. 8 is a sectional view of an intermediary product as produced in the hinge forming unit, when using symmetrically shaped slats.

Hence, as initially formed, the sandwich structure is wider than the finally required composite structure. A part (not shown in detail) of the apparatus, upstream of rollers 22a and 22b, gently and progressively pushes in the flexible materials 3, 4 from both above and below the gaps 21, by means of a number of specially shaped Teflon covered spring wires, so that slats 1 become progressively closer to each other as they approach rollers 22a, 22b. FIG. 8 shows the intermediary structure 26 with the narrowing gaps 27 and the spring wires 28 in cross section.

At the point where the slats are sufficiently close to each other for the frontal and backing sheet materials to make contact the sandwich structure will pass between the special pinch rollers (22a and 22b) and will have the hinge formed to the desired width, by permanently bonding the two flexible sheets and totally encapsulating the slats. This bonding can be effected in most cases by adhesives, but when identical thermoplastic frontal and backing sheets are used, these can be bonded by heat sealing.

The composite structure emerging from the hinge forming unit is now completely formed, identical to structure "a" of FIG. 1 and can be dealt with further as usual for similar structures. It can be trimmed and cut to the required sizes and provided with all the desired appurtenances.

Forming Composite Structures from Asymmetric Slats ("b" of FIG. 1)

If structure "b" of FIG. 1 has to be produced the process has to be somewhat modified, as the two flexible sheet materials (frontal and backing) required for the encapsulation of the slats are not identical in width, the slat profile being asymmetric.

Therefore the process is carried out in several modified steps, as follows:

1. Producing a non-permanent laminated structure

Figure 9:
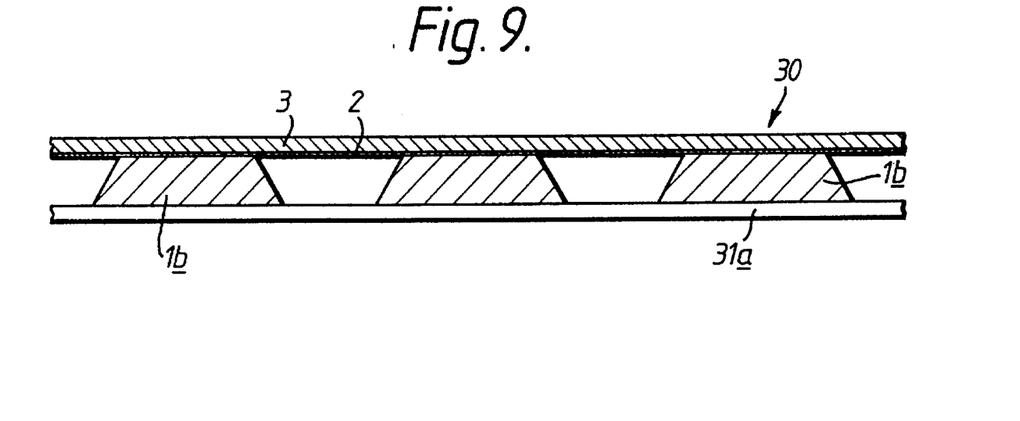
FIG. 9 is a sectional view of an intermediary product produced in the first laminating step, when using asymmetrically shaped slats.

In a first step, only the frontal material is laminated. To this purpose, the lower flexible sheet material 4 of FIGS. 5, 6 and 8 is replaced by a heavy silicone coated release paper 31a (re-usable), for the method step in which the upper or frontal sheet material is bonded to the upper surface of the slats. The "semi-sandwich structure" 30 emerging from this step is illustrated in FIG. 9 and consists of slats (1b), frontal flexible sheet material (3), adhesive (2) and release paper (31a).

For further processing the "semi-sandwich structure" (30) has to be always supported by a rigid flat surface, Such as a melamine faced board.

2. Forming non-permanent hinges

For this second step the hinge forming unit has to be slightly modified; by removing the bottom hinge forming springs and lower roller (22b), leaving only the upper part operative.

Figure 10:
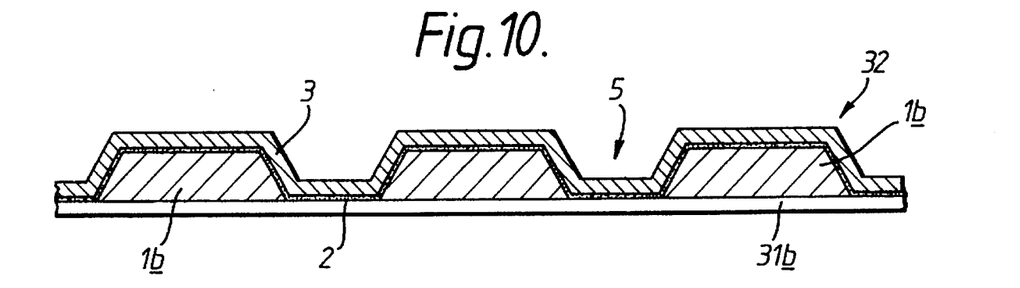
FIG. 10 is a sectional view of an intermediary product produced in one of the steps of the hinge forming unit, when dealing with asymmetrically shaped slats.

The "semi-sandwich structure" (30), supported by a rigid surface, is passed through the unit, which will form the structure illustrated in FIG. 10, in which slats (1b) are encapsulated on their frontal sides only—flat upper surfaces and sloping edges. The backing material, i.e. the removable release paper (31a) has to be removed from the "semi-sandwich structure" (30), before the hinge forming rollers (22a) become operative and replaced by a fresh release paper (31b) at the point of full action of rollers (22a). This is imperative as by the combined action of the hinge forming springs and the rollers (22a) the gaps between the slats diminish progressively and reach their predetermined spacing at this point. Thus the second release paper (31b) can play the role of the permanent backing material though the hinges are non-permanently formed i.e. the adhesive adheres only slightly to the release paper in the hinge area. With more elaborate machinery i.e. having special stations for each of the steps described, it would be possible to dispense with the repeated placing and removal of the various release papers.

3. Replacing the release paper with the permanent backing material

In this third step, the structure (32), produced in step 2 and illustrated in FIG. 10, has to pass through the laminating unit once again, together with the backing material provided with the adhesive, after the release paper (31b) has been removed.

4. Forming the permanent hinges

Immediately after emerging from the third step the structure is placed on the supporting flat surface and is made to pass once more through the hinge forming unit, as modified for step 2.

This time, the pressure applied by the upper hinge forming roller (21a) will permanently form the hinges by bonding the adhesive layers between the frontal and the backing sheet materials in the hinge areas and produce the composite structure as shown under "b" of FIG. 1.

After this step the product is ready for the usual cutting and trimming operations.

Forming Composite Structures Without Adhesives ("c" and "d" of FIG. 2)

If structures "c" or "d" shown in FIG. 2 are to be produced the same steps as used above will be employed, albeit with a few modifications.

Figure 11:
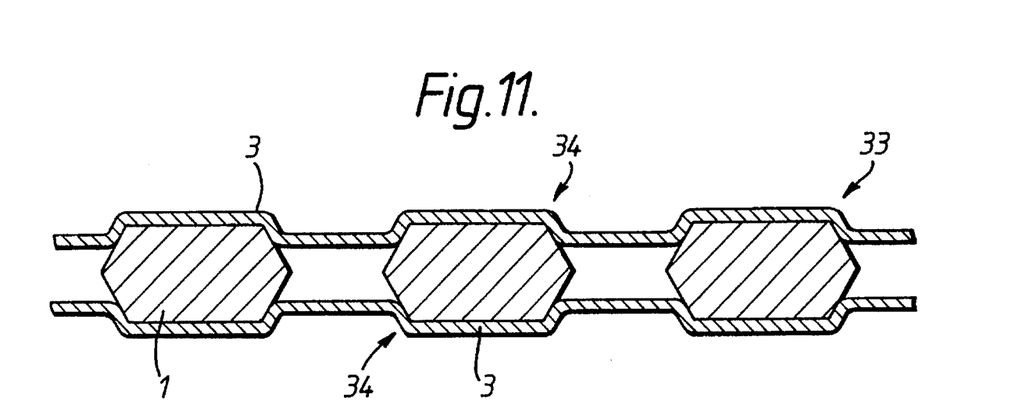
FIG. 11 is a sectional view of an intermediary product from the first laminating step, when using no adhesive in the process.

If adhesives are to be eliminated from the process a slight preheating of the thermoplastic films, before entering the laminating unit, becomes necessary and allows the foils to be pressure formed around the corners of the profiled slats, as shown in FIG. 11 and illustrated by the structure (33) formed initially in the production of composite structure "c" of FIG. 2.

The slight shaping (34) of the foils around the corners of the slats ensures that the slats are properly kept in position even after leaving the laminating unit.

In the subsequent operation the hinges are formed in the hinge forming unit. The pressure discs in the hinge forming unit are Teflon coated and are preheated to a temperature necessary to achieve the bonding by heat-sealing of the two thermoplastic foils, to form the hinges.

The heating steps involved in shaping and heat-sealing the plastics foils will cause their expansion, but after cooling they will contract and will ensure a shrink tight encapsulation of the slats.

Having thus described the main features of the product and the preferred embodiments of the process and apparatus it will be understood that the invention represents a novel and highly practical and economical way of obtaining a great variety of novel products to be used as roller doors, folding doors, shutters, partitions and the like, virtually tailor-made for each application yet produced by a mass production technique.

It will be appreciated that by using slats of transparent material, for example of transparent plastics, and front and backing sheets 3, 4 of transparent plastics film, it is possible to provide a wholly transparent roller door or closure or the like structure.

Whilst, for convenience, the structures concerned have been referred to above as roller door structures, it will be appreciated that structures embodying the invention may be utilised as closures for window openings, storage compartments, to cover control or instrument panels or in other applications requiring a transversely rigid structure which can be rolled up longitudinally, or folded, for storage or other purposes, (regarding the transverse direction in the structure as being the longitudinal direction of the slats and the longitudinal direction in the structure as being transverse to the slats, regardless of the relative sizes of the edges of the structure when extended).

I claim:

1. A method of making a composite structure comprising:
   providing a plurality of elongate rigid slats, arranging the slats in an array in which the slats lie parallel with one another and in transversely spaced relation with predetermined spaces between adjacent slats so that the array has a first side and a second side with each of said slats providing part of said first side of the array and part of said second side of the array; feeding the array of slats in the longitudinal direction of the slats through apparatus in which a first flexible sheet is secured on said first side of the slats;
   subsequently deforming said first sheet into the spaces between adjacent slats towards said second side of the array as the slats and said first sheet are conveyed in the longitudinal direction of said slats whilst causing concomitant movement of said slats closer towards one another to permit such deformation of said first sheet;
   applying a second flexible sheet on said second side of the slats;
   bringing said first sheet and said second sheet into contact with one another in the spaces between the slats; and
   securing said sheets together in regions of contact between said sheets, whereby each slat of said plurality of slats is tightly encapsulated between the first and second sheets and the sheets, in the regions of contact of said sheets between adjacent slats, form respective hinge strips interconnecting the adjoining slats.

2. A method according to claim 1 wherein said second flexible sheet is applied on said second side of the array, after said first flexible sheet has been deformed, in the spaces between the slats, substantially to reach said second side, whereby the regions of contact between said first and second sheets, and the hinges formed by securing the sheets together lie substantially at said second side of said array.

3. A method according to claim 2 wherein said first sheet is bonded to the surfaces of said slats on said first side of the array before deformation of the first sheet into the spaces between the slats.

4. A method of making a composite structure comprising:
   providing a plurality of elongate rigid slats, each of said slats having an upper surface and a lower surface;
   arranging the slats in an array in which the slats lie parallel with one another and in transversely spaced relation with predetermined spaces between adjacent slats;
   feeding the array of slats in the longitudinal direction of the slats through apparatus in which a first flexible sheet is secured to the upper surfaces of the slats of said array and a second flexible sheet is secured to the lower surfaces of the slats of said array;
   subsequently deforming said first sheet and said second sheet towards one another in the spaces between adjacent slats as the slats and said first and second sheets are conveyed in the longitudinal direction of said slats whilst causing concomitant movement of said slats closer towards one another to permit such deformation of said sheets, until said first sheet and said second sheet are brought into contact with one another in the spaces between the slats, so that said first and second sheets meet in regions of contact intermediate said upper surface and said lower surface of the slats of the array; and
   securing said sheets together in said regions of contact between said sheets, whereby each slat is tightly encapsulated between the first and second sheets and the sheets, in the regions of contact of said sheets between adjacent slats, form respective hinge strips interconnecting the adjoining slats.

5. A method according to claim 4 wherein said first and second sheets are bonded to the upper and lower surfaces respectively of the slats before deformation of the first and second sheets into the spaces between the slats.

6. Apparatus for making a composite structure comprising means for receiving and locating a plurality of slats in a parallel, side by side arrangement with established predetermined spaces between adjacent ones of said slats to thereby form an array of said slats having a first side and a second side with each of said slats having a surface portion forming part of said first side of the array and a surface portion forming part of said second side of the array, means for securing to said first side of said array of slats, a first flexible sheet; conveying means for conveying said array of slats in the longitudinal direction of the slats; deforming means for deforming said first flexible sheet secured to said first side of said array towards the second side of the array in the spaces between adjacent slats, as the slats, with said first sheet, are conveyed in the longitudinal direction of said slats, said means for deforming causing concomitant movement of the slats towards one another to reduce transverse spacing between the slats in the array, means for applying to said second side of said array, a second flexible sheet; and means for securing together the first and second sheets in the spaces between adjacent slats whereby each slat is tightly encapsulated between the first and second sheets and the secured together sheets form respective having strips interconnecting the adjacent slats.

7. Apparatus according to claim 6 wherein said means for receiving and locating the slats comprises a table having a supporting surface for supporting slats, means supporting a plurality of bars extending transversely across the table and spaced above said supporting surface, and a plurality of adjustable members on said bars, each said adjustable member having a vertical tooth extending downwards toward the support table surface, whereby said teeth act as spacers to space apart said slats in parallel transversely spaced relationship on the table.

8. Apparatus according to claim 6 wherein said deforming means comprises at least one row of coaxial rollers extending transversely across a conveying path of said conveying means.

9. Apparatus according to claim 8 wherein said deforming means further comprises a series of spring wires upstream of said rollers, the wires being spaced apart transversely of the conveying direction for engaging said first sheet in places between adjacent said slats in said array.

10. Apparatus for making a composite structure comprising means for receiving slats, for locating a plurality of said slats in a parallel side by side arrangement and for establishing predetermined spaces between adjacent ones of said slats whereby an array of said slats is formed, having a first side and a second side with each of said slats having a surface portion forming part of said first side of the array and a surface portion forming part of said second side of the array, means for securing to said first side of said array a first flexible sheet and for securing to said second side of said array a second flexible sheet, conveying means for conveying said array of slats, in the longitudinal direction of the slats, deforming means for deforming said first flexible sheet and said second flexible sheet, applied respectively to said first side of said array and to said second side of said array, towards each other in the spaces between adjacent slats, as the slats, with said first and second sheets, are conveyed in the longitudinal direction of said slats, whilst allowing concomitant movement of the slats towards one another to reduce transverse spacing between the slats, the apparatus including means for securing said first and second sheets together in said spaces between adjacent slats at locations intermediate said first and second sides of said array, whereby each slat is tightly encapsulated between the first and second sheets and the secured together sheets form respective hinge strips interconnecting the adjacent slats.

11. Apparatus according to claim 10 wherein said deforming means comprises at least one row of coaxial rollers, said row extending transversely across a conveying path of said conveying means.

12. Apparatus according to claim 10 wherein said deforming means further comprises a series of spring wires upstream of said rollers, the wires being spaced apart transversely of the conveying direction for engaging said first sheet in places between adjacent said slats in said array.

* * * * *